United States Patent Office.

WILLIAM C. QUINBY, OF SAN FRANCISCO, CALIFORNIA.

ELECTROLYTE AND DEPOLARIZER FOR GALVANIC BATTERIES.

SPECIFICATION forming part of Letters Patent No. 355,412, dated January 4, 1887.

Application filed March 16, 1886. Serial No. 195,479. (No specimens.)

*To all whom it may concern:*

Be it known that I, WILLIAM C. QUINBY, of the city and county of San Francisco, State of California, have invented an Improvement in an Electrolyte; and I hereby declare the following to be a full, clear, and exact description of the same.

My invention relates to certain improvements in galvanic batteries, and its object is the production of an electrolyte or excitingfluid containing a depolarizing element that will absorb or engage the hydrogen as fast as it is produced by the action of the galvanic cell, thereby producing an electric current (so called) the electromotive force of which is nearly constant.

The electrolyte or exciting-fluid which I employ is the anhydrated sulphate of sesquioxide of iron dissolved in water or other equivalent liquid. This anhydrous sulphate can be produced by the calcination of the pyrites of iron and combining the sesquioxide produced by the calcination with anhydrous sulphuric acid. It can also be produced by depriving the sulphate of iron (green vitriol) of its acid and calcining the oxide thereof to an anhydrate and combining the same with anhydrous sulphuric acid. Nature, however, has produced this anhydrous sulphate of the sesquioxide of iron in quantity, and it has been named by mineralogists "Coquimbite," and it is this particular salt that I prefer to employ. The analysis I have made of this salt shows that in one hundred parts it contains thirty-five to forty-five per cent. of anhydrous sulphuric acid, and from twenty-five to thirty per cent. of anhydrous sesquioxide of iron, the balance being water of crystallization and traces of other metals, or oxides thereof. Its color varies from sky-blue to yellow, garnet, coffee-color, and almost black. The light-colored pieces when broken are translucent. Upon exposure to the light and in a moist atmosphere the salt assumes a dark resinous appearance, and in time changes to a yellowish tint, not unlike that of the yelk of an egg. When exposed to the heat of a furnace, all the different colors change to the yellowish hue mentioned above, and as the heat continues the salt gives up the water of crystallization, and finally its sulphuric acid, leaving in the retort or furnace the sesquioxide of iron in the form of very fine powder of a light-gray color. The galvanic cell I employ may be composed of any of the usual metals used for such purposes, such as zinc and carbon, zinc and copper, metallic iron and carbon, or any other combination of metals as electrodes, in contact with the electrolyte in a retaining-vessel.

As the action of this electrolyte in a single-fluid galvanic cell, with iron and carbon employed as the electrodes, will apply to any other combination of metals, I will describe my method of preparing my galvanic cell.

In a retaining-vessel of any kind I place the electrodes of iron and carbon. I then dissolve the salt in water or other liquid and surround the electrodes therewith. No chemical or galvanic action observable results until the electrodes are placed in contact or are connected, when the electric current (so called) is at once developed. The cell develops no gases that are observable, and there is no "crystallizing" or "crawling" within the cell, as is often the case in most galvanic cells. I therefore conclude that the hydrogen developed by the decomposition of my electrolyte combines with, or is engaged or retained by, the sesquioxide of iron. The sulphuric acid of the electrolyte having a greater chemical affinity for the electrodes of the cell than it has for the sesquioxide of iron, attacks the electrodes, giving up the sesquioxide of iron, which combines with or holds the hydrogen, and by gravitation settles to the bottom of the cell in the form of a light-gray powder, where it may be recovered and again converted into a hydrated sulphate by combining it with hydrated sulphuric acid, (acid of commerce.) This hydrated sulphate being reduced with water or other solvent, forms an electrolyte or excitingfluid, the chemical and electrical action of which is nearly the same as that of the natural salt, but of less efficiency, for the reason that the oxide has already combined with a certain amount of hydrogen when it was liberated by the action of the cell, and there being traces of nitric acid in nearly all of the sulphuric acid of commerce there is developed by the combination of this trace of nitric acid with the hydrated oxide a certain amount of anhydrous sesquioxide of iron, which gives to it the only efficiency it possesses. I do not, however, claim that there is anything new in this method of producing an electrolyte for voltaic batteries included in the above-described mode of recovering the sesquioxide, for I am aware of the invention of De Laurier, set forth in Cazin's "Piles Electrique," in which a solution of the sulphate of the protoxide of iron, mixed with sulphuric and nitric acids in certain proportions and in a particular manner, is used as an electrolyte, the mixture producing at a certain point in the reaction sulphate of sesquioxide of iron.

I am also aware that a similar hydrated sulphate of the sesquioxide of iron has been suggested as an electrolyte in the description of Bacco's battery in Du Monsel's Application de l'Electricite, tome 1, page 335; also, that the sesquioxide of iron has been used as a depolarizer in combination with a chloride solution. These solutions differ from mine in this, that in these the sulphate of sesquioxide of iron is hydrated, while mine is anhydrous, and having no hydrogen in combination its oxide is in condition to combine with its full equivalent whenever the proper conditions occur; but whatever the theory may be, I obtain, as I have demonstrated by experiment, an improved result by the use of the anhydrous sulphate.

I claim as my invention—

A galvanic cell composed of an outer retaining-vessel with electrodes consisting of different metals, in combination with an electrolyte or exciting-fluid composed of coquimbite or previously-prepared anhydrous sulphate of the sesquioxide of iron in solution, substantially as described.

In witness whereof I have hereunto set my hand.

WILLIAM C. QUINBY.

Witnesses:
S. H. NOURSE,
H. C. LEE.